(12) United States Patent
Thomas

(10) Patent No.: US 6,971,305 B1
(45) Date of Patent: Dec. 6, 2005

(54) SMOKE GENERATOR CARTRIDGE FOR FOOD PROCESSING

(76) Inventor: Thomas A. Thomas, 1399 SW. 30th Ave. Bay 8, Boynton Beach, FL (US) 33426

(*) Notice: Subject to any disclaimer, the term of this patent is extended or adjusted under 35 U.S.C. 154(b) by 0 days.

(21) Appl. No.: 10/787,273

(22) Filed: Feb. 27, 2004

(51) Int. Cl.⁷ .............................. A23L 1/00; A23L 1/01; A23B 4/04
(52) U.S. Cl. ........................................ 99/482; 99/467
(58) Field of Search .................. 99/467, 481–483, 99/339, 340, 444–450, 399, 516, 480; 426/235, 426/314, 315; 126/25 R, 25 A, 59.5, 79; 131/329, 330, 185, 200; 110/108, 102, 118, 110/196; 206/525, 524.6

(56) References Cited

U.S. PATENT DOCUMENTS

| | | | | |
|---|---|---|---|---|
| 2,611,311 A | * | 9/1952 | Irwin | 99/482 |
| 2,967,023 A | * | 1/1961 | Huckabee | 239/60 |
| 3,347,148 A | | 10/1967 | Williams | |
| 4,779,525 A | * | 10/1988 | Gaines | 99/482 |
| 5,048,406 A | * | 9/1991 | Cofer | 99/482 |
| 5,193,445 A | * | 3/1993 | Ferguson | 99/482 |
| 5,301,606 A | * | 4/1994 | Ferguson | 99/482 |
| 6,019,035 A | * | 2/2000 | Jonas et al. | 99/482 |
| 6,481,344 B1 | * | 11/2002 | Green et al. | 99/482 |
| 6,705,213 B1 | * | 3/2004 | Thomas | 99/482 |

* cited by examiner

Primary Examiner—Timothy F. Simone
(74) Attorney, Agent, or Firm—Alvin S. Blum

(57) ABSTRACT

An assembly for generating a continuous stream of smoke for food processing such as barbecue cooking includes a reusable cartridge holder for holding upright a disposable smoke generating cartridge. The cartridge includes an outer covering enclosing a chamber. The covering includes a perforated top, a non-perforated upper portion designed to not burn during the process and a readily combustible lower portion. At the bottom of the chamber is a readily combustible tinder material that is easily set afire by the burning lower portion. The balance of the chamber is filled with wood pellets that smolder and emit desirable smoke when ignited by the tinder, the smoke passing upward through the perforated top. The convection currents produce a stream of smoke without the need for a fan. The pellets don't fall through the cartridge after the bottom portion burns away because they swell up and are held in place within the upper portion.

14 Claims, 1 Drawing Sheet

SMOKE GENERATOR CARTRIDGE FOR FOOD PROCESSING

BACKGROUND OF THE INVENTION

When preparing food, such as on a barbecue grill, it is well known to add wetted wood chips to the fire to generate smoke that enhances the flavor of the food. As the wet wood smolders, it generates smoke, and also dries out. The dry wood then burns with little or no smoke. U.S. Pat. No. 3,347,148 issued Oct. 17, 1967 to Williams discloses a wood chips packed cylinder made of a fine metal mesh that acts as a flame arrester to prevent the wood from bursting into flames. No facilities are provided for refilling the cylinder. U.S. Pat. No. 4,934,272 issued Jun. 19, 1990 to Sternin et al. discloses a combustible cylinder made of rice paper packed with sawdust of a particular particle size that is designed to smolder like a cigar, independent of the heat from the barbecue. The cylinder is designed to burn from one end to the other suspended in a ring. The entire cylinder is within a moving air stream with the air then moving into the barbecue. U.S. Pat. No. 5,048,406 issued Sep. 17, 1991 to Cofer discloses a perforated cylinder of a non combustible material packed with small wood particles designed to char and smoke when resting on burning coals of a barbecue. The empty cylinder is cooled and disposed of after use.

It is difficult to get a controlled uniform smoke emission over a period of time from the apparatus of the prior art, and to add fuel while in continuous operation. It would be useful to have a cartridge that would emit wood smoke continuously when lit without bursting into flame or requiring the cooking fire to maintain the smoking condition.

SUMMARY OF THE INVENTION

It is accordingly an object of the invention to provide a prefilled cartridge assembly that would supply a continuous supply of wood smoke when ignited. It is yet another object that the assembly have a reusable cartridge holder that supports disposable cartridges prefilled with material that emits a continuous controlled wood smoke. It is yet another object that the assembly have a reusable cartridge that is easily lit and continues to emit smoke independent of an external heat source once ignited.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 2:
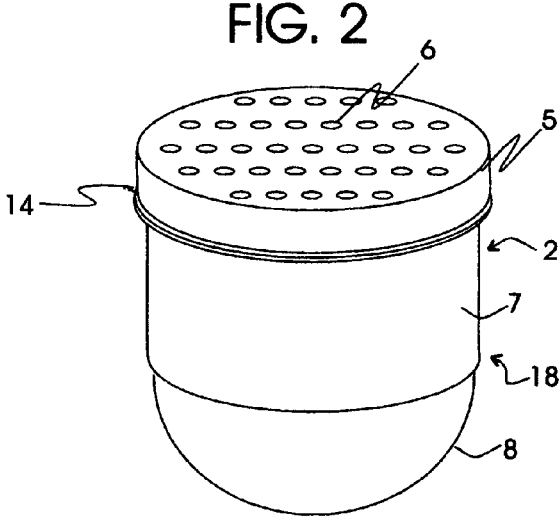
FIG. 2 is a is a perspective view of the cartridge.
Figure 3:
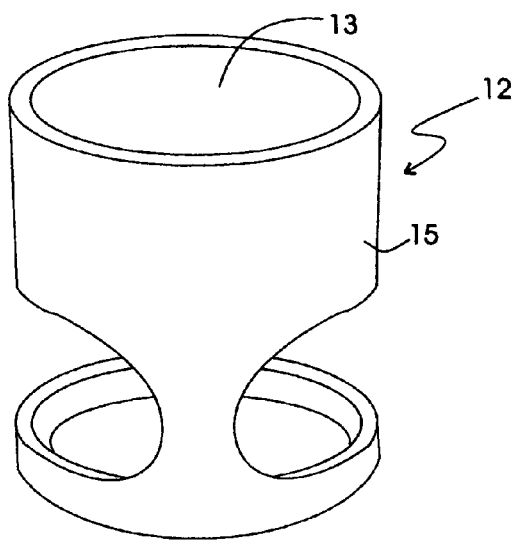
FIG. 3 is a perspective view of the cartridge holder.
Figure 1:
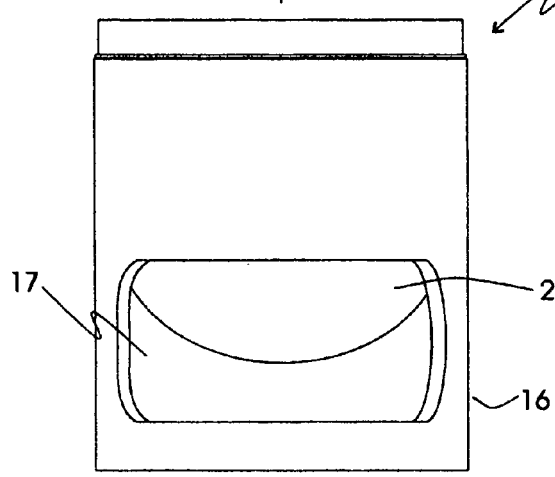
FIG. 1 is a front elevation view of the cartridge assembly of the invention.
Figure 4:
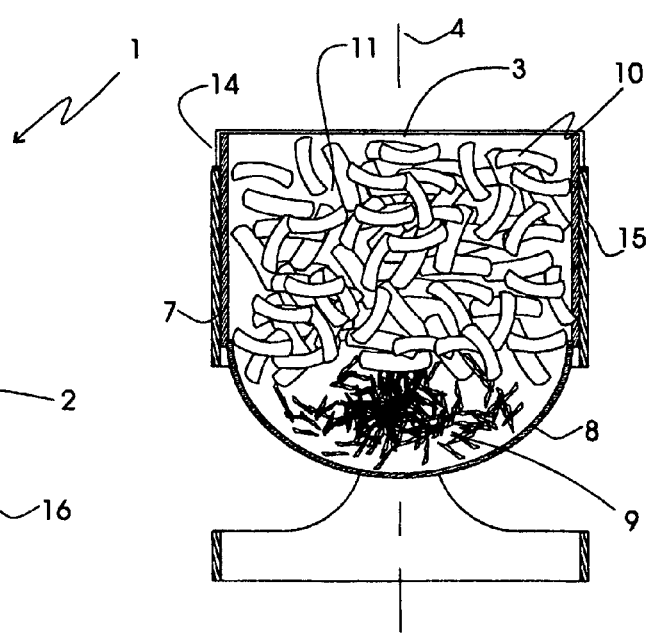
FIG. 4 is a sectional view thorough line 4—4 of FIG. 1.

Referring now to the drawing figures, the smoke generating assembly 1 of the invention includes a disposable, smoke generating cartridge 2 prefilled with wood pellets 10 that emit smoke with desirable flavor properties for food processing such as barbecue cooking when smoldering. The cartridge is held in a reusable cartridge holder 12 that is preferably positioned away from the burning coals but where the smoke will permeate the food. The cartridge holder 12 is made of a non-combustible material such as metal or ceramic.

The cartridge 2 has an outer covering 18 that defines and securely encloses a chamber 3 with a central axis 4. The outer covering 18 include a top portion 5 provided with multiple perforations 6 to permit free emission of smoke therethrough. The top portion may be made of sheet metal, screening, or the like, with a descending rim 14. An imperforate annular band attached to the top portion forms the upper portion 7 of the covering. This may be made of an inexpensive material such as cardboard. An imperforate bottom portion 8 is attached to the bottom of the upper portion. It may be composed of a readily combustible material, such as, but not limited to, paper pulp impregnated with a combustion supporting material such as a nitrate salt. Potassium nitrate impregnated paper pulp has been found to be readily set afire by a match.

The contents of chamber 3 include at the bottom a portion of tinder material 9 such as nitrate impregnated wood chips. Above the tinder material 9, the balance of the chamber is filled with wood pellets 10. These pellets are well known in the art. They generally consist of sawdust from a wood that has aromatic smoke such as hickory. The sawdust is compressed, often with a binder, to form elongate pellets that smolder and emit a desirable smoke when ignited. The shape of the pellets results in the formation of a plurality of interconnected free interstitial spaces 11 around the pellets that permit the free flow of oxygen and smoke therethrough.

When the cartridge 2 is inserted into the cartridge holder 12 through its open top 13 as shown, the rim 14 of the cartridge is too large to pass through the open top, so that it engages the top 13 of the holder. This cartridge is thereby held in position with the central axis of the chamber vertical. An imperforate upper section 15 of the holder closely encloses the upper portion 7 of the cartridge to shield it from combustion. The lower section 16 of the holder is provided with large openings 17 to freely admit oxygen and a lighted match, or the like. When a fire is applied to the bottom portion 8, it readily burns. It in turn sets the tinder afire. This in turn ignites the pellets. The pellets smolder and emit smoke. The hot smoke rises vertically, passing through perforation 6 and to the food. The convection currents bring oxygen through openings 17. A smoke current is provided without the need for a forced air apparatus. The pellets smolder and produce a continuous stream of smoke for a prolonged period.

Although the bottom portion 8 and the tinder 9 burn away, the pellets do not full through. They swell from the heat and moisture released by the burning paper pulp and tinder, pressing them together and against the upper portion, while still leaving adequate interstitial spaces for smoke production and flow.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:
1. A smoke generating assembly comprising:
 a) a disposable, prefilled, smoke generating cartridge comprising:

i) an outer covering defining a chamber with a central axis, the chamber containing wood smoke generating materials therein;
ii) a perforate top portion of the outer covering;
iii) an imperforate annular upper portion of the covering attached to the top;
iv) an imperforate, bottom portion of the covering sealing off the chamber to secure the smoke generating materials therein, the bottom portion constructed of a material that vigorously supports combustion when ignited;
v) a tinder material within the lowermost portion of the chamber arranged to burn readily after the bottom portion is ignited; and
vi) a plurality of randomly disposed wood pellets arranged to smolder when ignited by the tinder material, the pellets filling the chamber above the tinder material while providing ample interstitial spaces for free passage of smoke therethrough, the pellets arranged to swell from heat and moisture emitted by the burning bottom portion to hold together within the upper portion of the chamber after the bottom portion has burned away;

b) a cartridge holder for supporting the cartridge therein with the central axis vertical while the cartridge is smoldering and emitting smoke, the holder comprising:
i) an open top dimensioned to pass therethrough the upper and bottom portions of the cartridge while engaging the top portion to thereby hold the cartridge with the central axis vertical to enable smoke to be freely emitted from the top portion by convection;
ii) an imperforate upper section dimensioned to closely enclose the upper portion of the cartridge to shield it from combustion; and
iii) a perforate lower section to freely pass air to the smoldering cartridge.

2. The assembly according to claim 1 in which the bottom portion is made of paper pulp impregnated with a nitrate salt.

3. The assembly according to claim 2 in which the tinder material is wood particles impregnated with a nitrate salt.

4. The assembly according to claim 3 in which the top portion is made of cardboard.

5. A disposable, prefilled, smoke generating cartridge comprising:
a) an outer covering defining a chamber with a central axis, the chamber containing wood smoke generating materials therein;
b) a perforate, top portion of the outer covering;
c) an imperforate annular upper portion of the covering attached to the top;
d) an imperforate, bottom portion of the covering attached to the annular upper portion, the bottom portion sealing off the chamber to secure the smoke generating materials therein, the bottom portion constructed of a material that vigorously supports combustion when ignited;
e) a tinder material within the lowermost portion of the chamber arranged to burn readily after the bottom portion is ignited; and
f) a plurality of randomly disposed wood pellets arranged to smolder when ignited by the tinder material, the pellets filling the chamber above the tinder material while providing ample interstitial spaces for free passage of smoke therethrough, the pellets arranged to swell from heat and moisture emitted by the burning bottom portion to hold together within the upper portion of the chamber after the bottom portion has burned away, when the cartridge is supported with the central axis vertical.

6. The cartridge according to claim 5 in which the bottom portion is made of paper pulp impregnated with a nitrate salt.

7. The cartridge according to claim 6 in which the tinder material is wood particles impregnated with a nitrate salt.

8. The cartridge according to claim 7 in which the top portion is made of cardboard.

9. The cartridge according to claim 5 in which the wood pellets are made of compressed sawdust with a binder.

10. A disposable, prefilled, smoke generating cartridge comprising:
a) an outer covering defining a chamber with a central axis, the chamber containing wood smoke generating materials therein;
b) a perforate, top portion of the outer covering;
c) an imperforate annular upper portion of the covering attached to the top;
d) an imperforate, bottom portion of the covering attached to the annular upper portion, the bottom portion sealing off the chamber to secure the smoke generating materials therein, the bottom portion constructed of a material that vigorously supports combustion when ignited;
e) a tinder material within the lowermost portion of the chamber arranged to burn readily after the bottom portion is ignited; and
f) a plurality of randomly disposed wood pellets arranged to smolder when ignited by the tinder material, the pellets filling the chamber above the tinder material while providing ample interstitial spaces for free passage of smoke therethrough, after the bottom portion has burned away, when the cartridge is supported with the central axis vertical.

11. The cartridge according to claim 10 in which the bottom portion is made of paper pulp impregnated with a nitrate salt.

12. The cartridge according to claim 11 in which the tinder material is wood particles impregnated with a nitrate salt.

13. The cartridge according to claim 12 in which the top portion is made of cardboard.

14. The cartridge according to claim 10 in which the wood pellets are made of compressed sawdust with a binder.

* * * * *